United States Patent
Park et al.

(10) Patent No.: US 8,920,671 B2
(45) Date of Patent: Dec. 30, 2014

(54) ENVIRONMENTALLY-FRIENDLY FUNCTIONAL ANTIFOAMING AGENT USING LOESS

(75) Inventors: Gyunghee Park, Sasang-gu Busan (KR); Haekap Jeong, Saha-gu Busan (KR)

(73) Assignee: Green Chemical Co., Ltd. (KR)

( * ) Notice: Subject to any disclaimer, the term of this patent is extended or adjusted under 35 U.S.C. 154(b) by 544 days.

(21) Appl. No.: 13/381,550

(22) PCT Filed: Jun. 29, 2010

(86) PCT No.: PCT/KR2010/004192
§ 371 (c)(1),
(2), (4) Date: Mar. 16, 2012

(87) PCT Pub. No.: WO2011/002196
PCT Pub. Date: Jan. 6, 2011

(65) Prior Publication Data
US 2012/0168674 A1    Jul. 5, 2012

(30) Foreign Application Priority Data
Jul. 2, 2009 (KR) .................. 10-2009-0060233

(51) Int. Cl.
*C02F 5/08* (2006.01)
*C02F 1/50* (2006.01)
*B01D 19/04* (2006.01)
*C02F 1/52* (2006.01)
*C02F 1/76* (2006.01)

(52) U.S. Cl.
CPC ............. *B01D 19/0404* (2013.01); *C02F 1/50* (2013.01); *C02F 1/5245* (2013.01); *C02F 1/76* (2013.01); *C02F 2303/12* (2013.01); *C02F 2305/04* (2013.01)
USPC ........................................ 252/175; 524/588

(58) Field of Classification Search
None
See application file for complete search history.

(56) References Cited

U.S. PATENT DOCUMENTS 4,514,319 A    4/1985    Kulkarni et al.

FOREIGN PATENT DOCUMENTS

| KR | 1019980033476 A | 7/1998 |
|---|---|---|
| KR | 100325396 B1 | 3/2002 |
| KR | 100421438 B1 | 5/2004 |
| KR | 1020070048373 A | 5/2007 |

OTHER PUBLICATIONS

International Search Report (in Korean with English Translation) for PCT/KR2010/004192, mailed Feb. 21, 2011; ISA/KR.
English Translation of International Preliminary Report on Patentability (Chapter I of the Patent Cooperation Treaty) for PCT/KR2010/004192, issued Jan. 17, 2012.

*Primary Examiner* — Robert S Loewe
(74) *Attorney, Agent, or Firm* — Harness, Dickey & Pierce, P.L.C.

(57) ABSTRACT

An aspect of the present disclosure relates to a functional defoaming agent composition, and more particularly to an environmentally-friendly defoaming agent composition containing loess. In an aspect, a loess-based, environmentally-friendly functional defoaming agent includes: 1-20 wt % loess; 10-30 wt % silicone resin having a kinematic viscosity of 10-50,000 cst; 1-5 wt % thickening agent; 1-10 wt % natural surfactant; 1-10 wt % water-purifying agent; and 60-80 wt % water. In another aspect, a loess-based, environmentally friendly functional defoaming agent includes: 1-20 wt % inorganic mixture of loess with at least one selected from among elvan, tourmaline and germanium; 10-30 wt % silicone resin having a kinematic viscosity of 10-50,000 cst; 1-5 wt % thickening agent; 1-10 wt % natural surfactant; 1-10 wt % water-purifying agent; and 60-80 wt % water.

4 Claims, No Drawings

ENVIRONMENTALLY-FRIENDLY FUNCTIONAL ANTIFOAMING AGENT USING LOESS

TECHNICAL FIELD

An aspect of the present disclosure relates to a functional defoaming agent composition. More particularly, the present disclosure relates to an environmentally friendly defoaming agent composition containing loess or yellow soil.

BACKGROUND ART

Foam in seas, lakes, rivers and the like occurs due to physical turbulence of eddies and currents (air saturation) under a temporarily increased water surface tension by secretions from various aquatic organisms, organic materials, etc. In addition, foam frequently occurs by the use of various detergents such as surfactants into domestic sewage. In some industries, foam is artificially generated for use in manufacturing processes. For example, in refining operations for floatation, foam is generated and then eliminated by deforming. In general, foam naturally disappears, but is maintained when it has a high concentration of proteins and non-ionic lipids. The foam blocks the penetration of UV rays into water and interferes with aeration. This causes eutrophication leading to a red tide phenomenon. The occurrence of red tide has significant adverse effects on the ecosystem, because it reduces the concentration of oxygen in water to thereby kill fishes and shellfishes from suffocation. Thus, in order to eliminate foam, various defoaming agents have been used.

As is known in the art, the most popular silicone defoaming agents are prepared by emulsifying silicone oil compounds obtained by dispersing fine inorganic powders, such as silica, titanium dioxide and aluminum oxide, in silicon oil.

However, because of partial noxious ingredients prepared by petrochemical processes, the conventional deforming agents leave post-deforming precipitates which turn into contaminants to create a secondary environmental pollution.

DISCLOSURE

Technical Problem

Accordingly, aspects of the present disclosure have been made in order to solve the above-described problems occurring in the art and aim to provide a defoaming agent that is based on environmentally friendly natural materials and assists in the growth of aquatic organisms.

Technical Solution

In accordance with one aspect of the present disclosure, there is provided a loess-based, environmentally friendly functional defoaming agent comprising: 1-20 wt % of loess; 10-30 wt % of a silicone resin having a kinematic viscosity of 10-50,000 cst; 1-5 wt % of a thickening agent; 1-10 wt % of a natural surfactant; 1-10 wt % of a water-purifying agent; and 60-80 wt % of water.

In accordance with another aspect of the present disclosure, there is provided a loess-based, environmentally friendly functional defoaming agent comprising: 1-20 wt % of an inorganic mixture of loess with at least one selected from among elvan, tourmaline and germanium; 10-30 wt % of a silicone resin having a kinematic viscosity of 10-50,000 cst; 1-5 wt % of a thickening agent; 1-10 wt % of a natural surfactant; 1-10 wt % of a water-purifying agent; and 60-80 wt % of water.

The average particle diameter of each of the loess and the inorganic mixture is preferably 100-500 μm. Also, the natural surfactant is preferably prepared by adding 0.05-0.2 parts by weight of a catalyst to 100 parts by weight of a 1:5-1:7 mixture of natural fatty acid and α,γ-hydroxysiloxane.

Advantageous Effects

The loess-based, environmentally friendly functional defoaming agent according to the aspect of the present disclosure has the following effects.

First, because the defoaming agent according to the present disclosure is based on natural materials, including a natural surfactant, loess and elvan, it does not release hazardous substances after use. Thus, even when it is introduced into seas or rivers in large amounts, it has no detrimental effect on the biological stability of the seas or the rivers. Also, because it contains natural materials, it can be widely applied in all industries, including food, water purification and cosmetic industries.

Second, the defoaming agent according to the present disclosure has excellent dispersing and defoaming abilities compared to existing industrial silicone defoaming agents.

Third, because the defoaming agent according to the present disclosure contains loess, it has defoaming activity, the effect of adsorbing heavy metals from foam, and a purification effect caused by anions. Also, it emits far infrared rays to exhibit antibacterial effects that assist in the growth of fishes and aquatic organisms.

Fourth, the defoaming agent is cost-effective, because loess is available in an easy and inexpensive manner so that it can reduce the production cost of the defoaming agent.

Fifth, because the defoaming agent contains natural materials such as tourmaline and elvan, it can promote the growth of aquatic organisms and purify water.

BEST MODE

Mode for Invention

Hereinafter, aspects of the present disclosure will be described in further detail.

An aspect of the present disclosure relates to a loess-based, environmentally friendly functional defoaming agent comprising: 1-20 wt % of an inorganic mixture of loess with at least one selected from among elvan, tourmaline and germanium; 10-30 wt % of a silicone resin having a kinematic viscosity of 10-50,000 cst; 1-5 wt % of a thickening agent; 1-10 wt % of a natural surfactant; 1-10 wt % of a water-purifying agent; and 60-80 wt % of water.

The components of the loess-based, environmentally friendly functional defoaming agent according to the aspect of the present disclosure will now be described.

First, loess will now be described. Loess is a yellowish dark soil produced by the hydrothermal and weathering processes of liparite, andesite, granite and the like and is a kaolin-group clay mineral represented by a chemical formula of $Al_2O_3 2SiO_2 2H_2O$.

Loess is formed by the oxidation and weathering of the surface layer of the primary clay kaolin and is rich in $Fe_2O_3$ which is reddish. Also, it has a two-layer structure formed of a 1:1 mixture in the shape of a tetrahedron and an octahedron. Because it has low reactivity due to this structural stability, it is harmless to the environment. The following figure shows the structure of kanlinite that is the main component of loess (In-Kyu Kim, Sung-Hoon Seo, and Jin-Yang Kang, "General characteristics and iron oxide contents of loess", J. Kor. Pharm. Sci., Vol. 30, No. 3, p 219-222 (2000)).

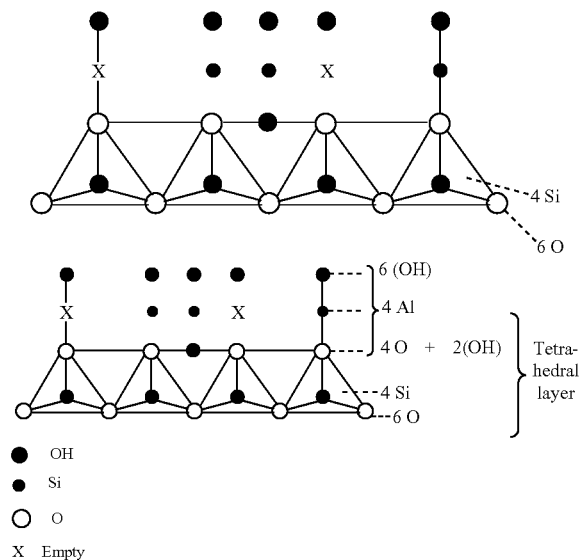

Kaolinite

The components of loess can be divided into microbiological components and chemical components. The microbiological components include: catalase that removes biologically toxic hydrogen peroxide to make soil suitable for organisms and has the highest activity; diphenoloxidase corresponding to an index of soil oxidation ability; saccharase; and protease that degrades proteins into amino acids when nitrogen in proteins is converted to minerals. These enzymes have various actions, including toxin removal, degradation, fertilization, and purification. The chemical components of loess include various mineral particles, including quartz, feldspar, mica and calcite. It is known that loess contains about 35-45% $SiO_2$, about 20-35% $Al_2O_3$, about 5-15% $Fe_2O_3$, about 2-3% MgO, and about 1-2% $Na_2O$.

Loess emits large amounts of far infrared rays essential for the growth of animals and plants such that it called the reservoir of solar energy. Thus, it is also called a "living organism". Due to such effects of loess, the far infrared rays emitted from loess can activate the physiological activity of cells to restore contaminated rivers or dying sea lives caused by red tide.

Minerals contained in loess can absorb anions and cations because of their surface charges and adsorb heavy metals, such as Cu, Pb, Cr and Zn, and floating matters, because of their porous structures and large surface areas. Thus, loess can be used for the purification of water.

In the present disclosure, loess serves to cause a partial imbalance in the surface tension of foam to break the foam, emit far infrared rays and adsorb heavy metals, and is added in an amount of 1-20 wt % based on the total weight of the defoaming agent. If the content of loess is less than 1 wt %, the ability of the defoaming agent to break up foam will be low, and if the content of loess is more than 20 wt %, loess will disadvantageously precipitate. In addition, the defoaming agent will be gelled, and thus the viscosity thereof will increase, resulting in a decrease in the ability to break up foam.

Elvan has been known and used as a medicinal mineral in China. It has a $SiO_2$ content of 65% more. In the present disclosure, elvan serves to improve the heavy metal-adsorbing ability of the defoaming agent and purify water. Due to the strong adsorption ability of the main component $SiO_2$ of elvan, it adsorbs harmful heavy metals, such as Cd and Hg. Also, elvan releases minerals, such as Mg, Fe, Mn, Al, Si and Ca, which act to purify water.

Tourmaline generates electricity by friction, and both ends thereof are positively and negatively charged upon heating. Tourmaline is known as a mineral that permanently emits anions and far infrared rays. In the present disclosure, tourmaline serves to promote the anion emission function of loess.

Germanium acts to adsorb heavy metals such as lead, copper and cadmium and emit far infrared rays. Although it has been mainly used in the electronic engineering field, it is currently synthesized as organiometallic compounds or organic chelating agents, which are widely used in the medical therapeutic field. It was reported that organic germanium has effects on the prevention of tumors, life-span extension, the inhibition of mutation, the treatment of viral infection, and the treatment of rheumatoid diseases. In recent years, it has been used in rice plants, strawberries, tomatoes, pears, dropwort, etc., in order to produce functional agricultural products. In addition, studies on the use of germanium in duck breeding to improve the quality of the meat have been conducted, and the results of the studies showed that germanium improved the quality and softness of the meat and delayed the oxidation of the meat during storage (Korean Journal for Food Science of Animal Resources, Vol. 23, No. 3, p 200-208, 2003).

The above-described inorganic materials that are used in the present disclosure have an average particle diameter of 100-500 μm. If the average particle diameter is too small, the defomaing agent can be gelled, and if the average particle diameter is too large, the inorganic materials can precipitate in the defoaming agent.

The environmentally friendly reactive silicone resin that is used in the present disclosure functions to mix the components of the defoaming agent uniformly with each other and reduce the surface tension of foam and is added in an amount of 10-30 wt % based on the total weight of the defoaming agent. Silicone resin is a food additive that is used to eliminate foam from food products, and the safety of which was recognized by the Korea Food and Drug Administration. The silicone resin has been used in various concentration, fermentation and distillation processes to assist in making the products uniform. In the fermentation industry, it is used in the production of yeasts, lactic acids and alcohols, and in the food industry, it is used in the production of soy sauce, sugar, molasses, milk products, jam, juice products, bean-curd and the like. In the pharmaceutical industry, the silicone resin is used in the production of antibiotics and the concentration of vitamins.

The natural surfactant that is used in the present disclosure serves to reduce the surface tension of foam to break up the stability of the foam due to its low intermolecular attraction force and the water-repellent property and non-contact property of the surface thereof and disperse the solid materials such as loess. The natural surfactant is added in an amount of 1-10 wt % based on the total weight of the defoaming agent. The surfactant that is used in the present disclosure is not a surfactant resulting from petroleum refining, but is a surfactant based on oleic acid-containing soybean oil, castor oil or sugar, which is harmless to the environment and the human body. Also, it does not cause environmental contamination after use, unlike existing industrial surfactants.

The thickening agent that is used in the present disclosure serves to maintain the viscosity of the defoaming agent at a constant level and is added in an amount of 1-5 wt % based on the total weight of the defoaming agent. The thickening agent is a natural thickening agent. Examples of the natural thickening agent include xanthane gum, natural cellulose, Hycell (hydroxyethyl cellulose), methyl cellulose, carbomer, Carbopol Pre-Gel, gelatin and the like.

The water-purifying agent that is used in the present disclosure functions to kill pathogens, including bacteria, viruses and spores, in water, and to remove heavy metals from water. Examples of the water-purifying agent include aluminum sulfate-based water-purifying agents, chlorine-based water-purifying agents, etc. In examples of the present disclosure, sorbitol (molecular substance rich in —OH groups) that is a food additive was used as the water-purifying agent.

Hereinafter, a method of preparing the loess-based environmentally friendly functional defoaming agent using the above-described components according to the aspect of the present disclosure will be described.

A method of preparing the natural surfactant will now be described. In a reactor, a natural fatty acid such as castor oil or soybean oil (containing oleic acid, linoleic acid and linolenic acid) is mixed with α,γ-hydroxysiloxane at a weight ratio of 1:6 and stirred at room temperature. Herein, the α,γ-hydroxysiloxane (polyethylene glycol) is esterified with the natural fatty acid. Then, a catalyst is added to the reaction material in an amount of 0.05-0.2 parts by weight based on 100 parts by weight of the reaction material, and the material is allowed to react under reflux at 130° C.~160° C. for 6 hours. Water produced during the reaction is separated and removed by a Dean-Stark trap. After completion of the reaction, the reaction product is cooled at room temperature, thus obtaining a natural surfactant as a dark yellow liquid.

A method of preparing an environmentally friendly functional defoaming agent using the above-prepared natural surfactant will now be described. A suitable amount of water is placed in a reactor, and the natural surfactant is added thereto while the solution is stirred with inline mixing, after which the solution was continuously stirred at room temperature. After sufficient mixing, silicone resin as a food additive, a thickening agent and a water-purifying agent are added thereto, and the mixture is sufficiently stirred. Then, an aqueous solution of inorganic materials, including loess, is added to the stirred mixture with stirring. Herein, loess, elvan, natural tourmaline and germanium are used after these materials were ground finely and screened to a particle size of 100 mesh or more. In each of the steps, sufficient stirring is performed to ensure uniform dispersion.

Hereinafter, the present disclosure will be described in further detail with reference to examples, but the scope of the present disclosure is not limited to these examples.

Example 1

1 g of soybean oil and 6 g of α,γ-hydroxysiloxane were mixed with each other, and 0.007 g of a catalyst was added thereto. The mixture was refluxed for 6 hours, and water produced by esterification was separated and removed, thus preparing a natural surfactant. Then, 3 g of loess was added to 40 g of water to prepare an aqueous solution of loess.

Then, 5 g of the above-prepared surfactant was added to 30 g of water and stirred at room temperature for 10 minutes. To the stirred solution, 7 g of silicone resin, 1 g of the natural thickening agent cellulose and 3 g of an edible water-purifying agent were added, and 43 g of the aqueous solution of loess was added thereto with continuous stirring. The mixture was stirred at 130° C. for 5 hours, thereby preparing a defoaming agent.

Example 2

A surfactant was prepared in the same manner as described in Example 1. Then, 3 g of loess, 1 g of elvan, 0.5 g of tourmaline and 0.5 g of germanium were added to 40 g of water and mixed, thus preparing an aqueous solution of the inorganic materials. Then, 6 g of the surfactant was added to 30 g of water and stirred at room temperature for 10 minutes. To the surfactant solution, 7 g of silicone resin, 2 g of the natural thickening agent cellulose and 4 g of an edible water-purifying agent were added, and 45 g of the aqueous solution of the inorganic materials was added thereto with continuous stirring. The mixture was stirred at 130° C. for 5 hours, thereby preparing a defoaming agent.

Comparative Example 1

A surfactant was prepared in the same manner as described in Example 1. Then, 25 g of loess was added to 60 g of water to prepare an aqueous solution of loess. Then, 5 g of the surfactant was added to 10 g of water and stirred at room temperature for 10 minutes. To the surfactant solution, 7 g of silicone resin, 1 g of the natural thickening agent cellulose and 3 g of an edible water-purifying agent were added, and 85 g of the aqueous solution of loess was added thereto with continuous stirring. The mixture was stirred at 130° C. for 5 hours, thereby preparing a defoaming agent. This Comparative Example was the same as Example 1, except that the content of loess was increased to 25 g.

Comparative Example 2

A surfactant was prepared in the same manner as described in Example 1. Then, 3 g of loess was added to 40 g of water to prepare an aqueous solution of loess. Then, 15 g of the surfactant was added to 30 g of water and stirred at room temperature for 10 minutes. To the surfactant solution, 7 g of silicone resin, 1 g of the natural thickening agent cellulose and 3 g of an edible water-purifying agent were added, and 43 g of the aqueous solution of loess was added thereto with continuous stirring. The mixture was stirred at 130° C. for 5 hours, thereby preparing a defoaming agent. This Comparative Example was the same as Example 1, except that the content of the surfactant was increased to 15 g.

Test Example 1

The defoaming abilities of the defoaming agents prepared in Examples 1 and 2 and Comparative Examples 1 and 2 were tested in the following manner, and the results of the test are shown in Table 1 below.

[Test Method for Defoaming Ability]
(1) Prepare 1 ml of a defoaming agent dilution containing 1 wt % of each of the defoaming agents.
(2) Prepare 40 ml of a foaming agent solution containing 1 wt % of a foaming agent.
(3) Mix 1 ml of the defoaming agent dilution with 40 ml of the foaming agent solution in a volumetric flask.
(4) Shake the volumetric flask for a predetermined time.
(5) Measure the time taken for the height of the foam to reach zero (0).

TABLE 1

| Shaking Time (min) | Defoaming Time (sec) | | | |
|---|---|---|---|---|
| | Example 1 | Example 2 | Comparative Example 1 | Comparative Example 2 |
| 1 | 8 | 6 | 6 | 12 |
| 2 | 17 | 15 | 16 | 23 |
| 3 | 27 | 23 | 25 | 33 |
| 4 | 35 | 31 | 34 | 42 |
| 5 | 46 | 39 | 42 | 52 |
| 6 | 57 | 41 | 48 | 66 |

As can be seen in Table 1 above, the loess-based, environmentally friendly functional defoaming agent according to the Examples of the present disclosure had excellent defoaming abilities compared to the defoaming agent of Comparative Example 2.

Unlike the defoaming agent of Example 1, the defoaming agent of Example 2 was prepared by adding the natural inorganic materials in addition to loess. It could be seen that the inherent characteristics of each of the inorganic materials contributed to the activation of the function of loess, thereby shortening the defoaming time. In Comparative Example 1 in which the content of loess was increased, there was a problem in that loess precipitated, even though the defoaming ability was excellent. In Comparative Example 2, the defoaming time was longer than those in Examples 1 and 2, because the surfactant that was added in an excessive amount acted to generate foam.

Test Example 2

The fish toxicity of the defoaming agent prepared in Example 1 was tested in the following manner, and the results of the test are shown in Table 2 below. Fish toxicity refers to the degree to which a solution or suspension of chemicals such as agricultural chemicals is poisonous to aquatic organisms such as fishes and shellfishes.

[Test Method for Fish Toxicity]

An acute fish toxicity test was performed with *Oryzias latipes* which is a fish for the acute fish toxicity test described in OECD TG 203 and for which sufficient basic data are accumulated. The test was performed in the following manner.

(1) 50 g of the defoaming agent is placed in a 12.5-L test water tank, test water is added to the water tank to a final volume of 5 L, and the solution is sufficiently stirred until complete (concentration: 10,000 mg/L).

(2) 10 fish are placed in each of the test water-containing water tank and a underground water-containing water tank.

(3) A water temperature of 21~25° C. and a 16-hr light/8-hr dark cycle was maintained, and the supply of feed is discontinued during a time period from 24 hours before the start of the test to the end of the test.

(4) Immediately after the start of the test, 24, 48, 72 and 96 hours after the test of the test, general intoxication, specific symptoms and the presence of dead fish are observed.

TABLE 2

| Concentration (mg/L) | Number of Fish Tested | Number of Dead Fish | | | | Lethality (%) | |
|---|---|---|---|---|---|---|---|
| | 10 | 24 hr | 48 hr | 72 hr | 96 hr | 48 hr | 96 hr |
| Underground Water | 10 | 0 | 0 | 0 | 0 | 0 | 0 |
| 10,000 | | 0 | 0 | 0 | 0 | 0 | 0 |

As can be seen in Table 2 above, no dead fish were observed up to 96 hours at a test concentration of 10,000 mg/L. In other words, the media lethal concentration ($LC_{50}$) of the defoaming agent was 10,000 mg/L or more. This suggests that the loess-based, environmentally friendly defoaming agent according to the Example of the present disclosure has no significant influence on aquatic fishes when it is exposed to the environment.

Although several exemplary aspects of the present disclosure have been described for illustrative purposes, those skilled in the art will appreciate that various modifications, additions and substitutions are possible, without departing from the scope and spirit of the disclosure as disclosed in the accompanying claims.

CROSS-REFERENCE TO RELATED APPLICATION

This application claims the benefit of priority under 35 U.S.C. Section 119(a) to Korean Patent Application No. 10-2009-0060233 filed in Korea on Jul. 2, 2009, the entire disclosure of which is incorporated herein by reference. In addition, for countries except the United States of America, this application claims the benefit of priority to Korean Patent Application No. 10-2009-0060233 filed in Korea on Jul. 2, 2009, the entire disclosure of which is incorporated herein by reference.

The invention claimed is:

1. A loess-based, environmentally friendly functional defoaming agent comprising: 1-20 wt % of loess; 10-30 wt % of a silicone resin having a kinematic viscosity of 10-50,000 cst; 1-5 wt % of a thickening agent; 1-10 wt % of a natural surfactant; 1-10 wt % of a water-purifying agent; and 60-80 wt % of water,
   wherein the natural surfactant is prepared by adding 0.05-0.2 parts by weight of a catalyst to 100 parts by weight of a 1:5-1:7 mixture of natural fatty acid and α,γ-hydroxysiloxane.

2. A loess-based, environmentally friendly functional defoaming agent comprising: 1-20 wt % of an inorganic mixture of loess with at least one selected from among elvan, tourmaline and germanium; 10-30 wt % of a silicone resin having a kinematic viscosity of 10-50,000 cst; 1-5 wt % of a thickening agent; 1-10 wt % of a natural surfactant; 1-10 wt % of a water-purifying agent; and 60-80 wt % of water,
   wherein the natural surfactant is prepared by adding 0.05-0.2 parts by weight of a catalyst to 100 parts by weight of a 1:5-1:7 mixture of natural fatty acid and α,γ-hydroxysiloxane.

3. The loess-based, environmentally friendly functional defoaming agent of claim 1, wherein the average particle diameter of the loess is 100-500 μm.

4. The loess-based, environmentally friendly functional defoaming agent of claim 2, wherein the average particle diameter of the inorganic mixture is 100-500 μm.

* * * * *